3,291,760
PREPARATION OF CONDENSATION PRODUCTS CONTAINING SILICON-NITROGEN LINKAGES
John W. Bayer, Perrysburg, Ohio, assignor to Owens-Illinois, Inc., a corporation of Ohio
No Drawing. Filed July 1, 1965, Ser. No. 468,982
6 Claims. (Cl. 260—2)

This invention relates broadly to a method of preparing new and useful condensation products, more particularly polymeric (including resinous) condensation products containing silicon-nitrogen linkages. Still more particularly it is concerned with condensation products of certain organosilanes with certain organocyclosilazanes.

It was known prior to the present invention that polymers of organocyclosilazanes could be prepared. Thus, Groszos and Hall (U.S. 2,885,370 dated May 5, 1959) disclose the preparation of polymers of 2,2,4,4,6,6-hexaphenylcyclotrisilazane by heating the monomer at various temperatures and under various conditions. In all cases the preformed monomer in undissolved state was heated in a sealed tube above its melting point (217° C.) for periods of time ranging from 24 hours at 450° C. to 5 minutes at 700° C. The products were polymers ranging from colorless viscous liquids to a light tan solid (10 minutes heating at 600° C.) or a dark brown resin (5 minutes heating at 700° C.).

The polymers of Groszos, et al., supra, are autogenous condensation products and, therefore, are difficult to reproduce both from the standpoint of chemical constitution and in their properties. Furthermore, the imino hydrogen of their polymeric silazane is unsubstituted; hence the polymer is less resistant to hydrolytic attack, particularly aqueous acids, than if this hydrogen were replaced by a hydrolytic-resistant grouping.

It is a primary object of the present invention to provide a method of preparing condensation products containing silicon-nitrogen linkages, and especially such polymeric condensation products that are resinous (including potentially resinous) in character; and which, particularly when the preferred starting reactants are employed, can be readily and uniformly reproduced under controlled conditions.

Another object of the invention is to provide a method of making products of the class described in the previous paragraph that have good thermal-stability and hydrolytic-resistant characteristics.

Other objects of the invention will be apparent to those skilled in the art from the following more detailed description.

The foregoing objects are attained by the production of compositions comprising a condensation product of (1) at least one di-(organo)silane represented by the general formula (I) 

where R and R' each represents a monovalent hydrocarbon radical and (2) at least one cyclosilazane represented by the general formula (II) 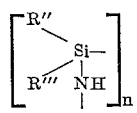

where R" and R'" have the same meanings as R and R', and $n$ represents an integer from 3 to 5, inclusive. Preferably $n$ is either 3 or 4; that is, the cyclosilazane of (2) is either an organocyclotrisilazane or an organocyclotetrasilazane. The reactants of (1) and (2) are employed in a ratio of from 0.2 to 1.5 mole equivalents, and preferably approximately ½ mole equivalent, of the di-(organo)silane of (1) for each =NH grouping in the cyclosilazane of (2).

Illustrative examples of monovalent hydrocarbon radicals represented by R and R' in Formula I and by R" and R'" in Formula II are alkyl (including cycloalkyl), alkenyl (including cycloalkenyl), aralkyl, aralkenyl, aryl, alkaryl and alkenylaryl. More specific examples of such radicals are methyl, ethyl and propyl through dodecyl (both normal and isomeric forms); cyclopentyl, cyclohexyl, cyclohexenyl, cycloheptyl, etc.; allyl, methallyl, propenyl, isopropenyl (β-allyl), 1-butenyl, 2-butenyl (crotyl), 3-butenyl, pentenyl, hexenyl, butadienyl, etc.; benzyl, phenylethyl, phenylpropyl, phenylisopropyl, phenylallyl, etc.; phenyl, biphenylyl or xenyl, etc.; tolyl, xylyl, ethylphenyl, propylphenyl, butylphenyl, allylphenyl, etc.

The monovalent hydrocarbon radicals represented by R and R' in Formula I may be the same or different, as may also those represented by R" and R'" in Formula II.

Preferably the various R's in Formulas I and II are saturated aliphatic (including saturated cycloaliphatic) or aromatic hydrocarbon radicals; and, of these, still more preferably those containing not more than about 7 carbon atoms, e.g., methyl through heptyl, cyclohexyl, cyclopentyl, cycloheptyl, phenyl, tolyl and benzyl.

In producing the condensation products of the invention a di-(organo)silane (or a plurality of such silanes) of the kind embraced by Formula I and a cyclosilazane of the kind embraced by Formula II (or a plurality of such cyclosilazanes) are heated together in the stated proportions at a reaction temperature in the presence of a catalytic amount of a strongly basic catalyst at least until the evolution of hydrogen has substantially completely subsided.

Suitable catalysts (that is, strong bases) for use in carrying out the reaction include alkali-metal alkoxides, aryls and amides, e.g., sodium and potassium methoxides, ethoxides, n-propoxides, isopropoxides and tert.-butoxides, sodium and potassium amides, phenyllithium, indenyllithium, lithium ethylphenylamide, lithium diphenylamide; and the salts, with alkali-forming metals (group I-A and II-A metals), of alkanes, aralkanes, nitriles, amines, etc., e.g., dianiline calcium, ethyl sodium, etc. Such catalysts have been described as being salts, with an alkali-forming metal, of an acid having a pK$_a$ of from 15 to 75. Other suitable catalysts include the strongly basic quaternary ammonium hydroxides, e.g., tetramethyl ammonium hydroxide, tetraethanol ammonium hydroxide, benzyl trimethyl ammonium hydroxide, benzyl triethyl ammonium hydroxide, and others.

The strong base is employed only in a catalytic amount; for example, in an amount within the range of from about 0.01% to 5%, and preferably from about 0.1% to about 2%, by weight of the total weight of the di-(organo)silane and organocyclosilazane reactants.

Ordinarily the reaction mixture (including the catalyst) is heated gradually to the reaction temperature in order to minimize foaming due to the evolution of hydrogen by-product of the reaction. If desired, the by-product hydrogen can be collected, purified and used in hydrogenation or other chemical reactions, or for other purposes.

After evolution of hydrogen has subsided at the reaction temperature, which may range, for instance, between 100° C. and 400° C., depending upon the particular reactants employed, the particular catalyst and amount thereof that is used, and other influencing factors, one may then continue heating at the same or at a higher temperature until a polymer of the desired molecular weight has been obtained or until one is assured that the reaction has been carried to maximum completion under the particular conditions employed. If such heating to resinification of the initial condensation product is continued for a prolonged period, after evolution of hydrogen has ceased, at a temperature of the order of 200°–400° C. or higher, then it is usually advantageous to effect the heating while maintaining the reaction mass under a blanket of an inert gas, e.g., argon, nitrogen, helium or the like.

Taking hexamethylcyclotrisilazane as illustrative of the organocyclosilazane reactant and diphenylsilane as illustrative of the di-(organo)silane reactant, the reaction may be illustrated by the following equation when the silane is used in the ratio of ½ mole equivalent thereof for each =NH grouping in the cyclosilazane reactant; that is, in a molar ratio of 3 moles of diphenylsilane to 2 moles of hexamethylcyclotrisilazane.

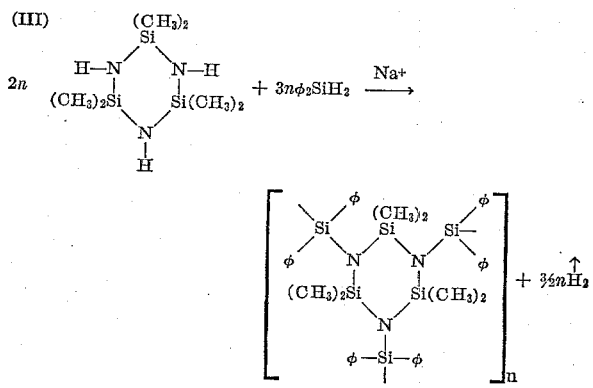

The symbol "$\phi$" where it appears in formulas shown in Equation III means the phenyl radical.

The polymers obtained by the method of this invention vary from viscous liquids to hard, glassy, resin-like solids. They are of the thermoplastic type or kind. They range in molecular weight from 1000 to 2000 or more, and are soluble in common organic solvents such as aliphatic and aromatic hydrocarbons, and polar solvents such as alcohols, ketones, chlorinated hydrocarbons, etc. They exhibit good stability to hydrolytic attack; and in most cases, particularly when using the preferred starting reactants, they are thermally stable up to about 400° C. The preferred resinous polymers are normally solids. They soften at a tempearture within the range of, for example, from about 60° C. to about 200° C.

In order that those skilled in the art may better understand how the present invention can be carried into effect, the following examples are given by way of illustration and not by way of limitation. All parts and percentages are by weight unless otherwise stated.

*Example 1*

Hexamethylcyclotrisilazane (21.9 g.; 0.1 mole) and diphenylsilane (18.4 g.; 0.1 mole) are reacted together using an alkali-metal alkoxide, specifically sodium methoxide, as a catalyst. While mechanically agitating the rection mixture, the temperature is raised slowly to 300° C. over a period of 2 hours, and held at that temperature for an additional 2 hours. Much foaming occurs at first, which is undoubtedly due to hydrogen evolution. At the end of the heating period, the product is poured into aluminum cups to cool. When cooled to room temperature (20°–30° C.) the product is a dark, transparent, brittle, thermoplastic resin; softening point, 140°–145° C. It is soluble in, for example, benzene, methyl ethyl ketone, isopropyl alcohol, hexane, and methylene chloride. An infrared examination of a sample of the resinous reaction product shows no Si-H bonds to be present.

*Example 2*

Example 1 is repeated with the exception that instead of diphenylsilane there is used, in individual runs, equivalent molar amounts of the following di-(organo)silanes:

(a) Di-n-hexylsilane
(b) Di(cyclohexyl)silane
(c) Dibenzylsilane
(d) Ditolylsilane In each case the resulting linear condensation polymer is a solid, thermoplastic resin when cold, the solubility and other physical characteristics of which are analogous with the resinous condensation polymer of Example 1.

*Example 3*

Example 1 is repeated with the exception that instead of hexamethylcyclotrisilazane there is employed, in individual runs, equivalent molar amounts of the following hexa-(organo)cyclotrisilazanes:

(a) Hexaethylcyclotrisilazane
(b) Hexaphenylcyclotrisilazane
(c) Hexatolylcyclotrisilazane
(d) Hexabenzylcyclotrisilazane
(e) Hexacyclohexylcyclotrisilazane Also, in the case of the last four cyclotrisilazanes mentioned above, the maximum temperature of heating ranges between 350° and 400° C. and the time that the reaction mass is held at the maximum temperature ranges between 15 minutes and about 3 hours. In general, the reaction may be discontinued when there is no further indication of the evolution of hydrogen; and any further heating after that point has been reached is merely done in order to provide better assurance of the completeness of the reaction to form a condensation product and/or to maximize the molecular weight of the final polymer.

The ultimate condensation polymers obtained by the method of this example are usually straw- to dark-colored, brittle, thermoplastic resins, especially when no particular precautions are taken to exclude air during the reaction period. However, clear, colorless or almost colorless, solid, thermoplastic resins also have been obtained.

In general, those resinous condensation products wherein the N-organo substituent of the cyclotrisilazane contains a carbocyclic grouping, i.e., reactants (b), (c), (d) and (e) of this example, have improved thermal resistance as compared with the condensation polymers of Examples 1 and 2 and the condensation polymer of hexaethylcyclotrisilazane and diphenylsilane.

*Example 4*

This example illustrates the use of different molar ratios of reactants, more particularly 1.5 moles of the di-(organo)silane per mole of the hexa-(organo)cyclotrisilazane, and a different heating schedule.

|  | Weight, g. | Molar Ratio |
|---|---|---|
| Hexamethylcyclotrisilazane | 21.9 | 1.0 |
| Diphenylsilane | 27.6 | 1.5 |
| Sodium methoxide | 0.1 |  |

As in Examples 1 through 3, the sodium methoxide (sodium methylate) is added to the reaction mixture before heating is started.

The reaction mixture is heated, with agitation, to 300° C. over a period of 1 hour, and held at that temperature for 2 hours. A sample is then drawn off as described in Example 1, and later subjected in infrared examination. Its softening point is 140°–150° C.

The remainder of the reaction mass is heated for an additional three hours at 200° C., poured into an aluminum cup and allowed to cool to room temperature. Like the product of Example 1, it is a dark, transparent, brittle, thermoplastic resin; softening point 150°–155° C.;

M.W. 1700–1900 (osmotic method, methyl ethyl ketone as solvent).

Infrared examination of each of the two specimens of linear polymer obtained in this example shows identical spectra to that of Example 1, with a very slight band indicating Si-H bonding.

Examples 1 and 4 are illustrative of the preparation of compositions comprising a condensation product, more particularly a polymeric condensation product, of diphenylsilane and hexamethylcyclotrisilazane in a molar ratio of from 1 to 1.5 moles of the former per mole of the latter.

*Example 5*

This example illustrates the use of a higher polycyclic silazane as a reactant with a di-(organo)silane, and shows the results that are obtained both with or without a catalyst for the reaction.

A. *No catalyst*:

|  | Weight, g. | Molar Ratio |
| --- | --- | --- |
| Octamethylcyclotetrasilazane | 39.0 | 2 |
| Diphenylsilane | 12.2 | 1 |

The above ingredients are heated together, with agitation, to reflux temperature over a period of 2 hours, and are then heated at reflux (267° C.) for 2 hours. At the end of this heating period there is no evidence that any reaction has occurred. Crystals of the cyclotetrasilazane form upon cooling.

B. *With catalyst*:

The same compounds in the same amount are employed as in the A portion of this example plus 0.1 g. of sodium methoxide as a catalyst for the reaction. This catalyst is added before starting to heat the reaction mixture. Much foaming results while heating and agitating the reaction mixture to about 280° C. over a period of 2 hours. Heating is then continued for an additional 2 hours at about 280° C. A viscous, clear, colorless, resinous material results when the product is poured off and cooled to room temperature.

*Example 6*

This example is similar to Example 5–B with the exception that different molar ratios of reactants are employed.

|  | Weight, g. | Molar Ratio |
| --- | --- | --- |
| Octamethylcyclotetrasilazane | 29.4 | 1 |
| Diphenylsilane | 36.8 | 2 |
| Sodium methoxide | 0.1 |  |

The above reactants and catalysts are mixed and heated over a 2-hour period to 300° C. while agitating the reaction mixture. Much foaming occurs at the start of the reaction. The reaction mass is held at about 300° C. for about 2 hours. At the end of the reaction period the product is poured into an aluminum cup and allowed to cool to room temperature. A clear, colorless, brittle, thermoplastic resin results; softening point, 60°–70° C. The molecular weight of the resin is within the range of 1000–1200 (osmotic method).

Examples 5–B and 6 are illustrative of the preparation of compositions comprising a condensation product, more particularly a polymeric condensation product, of diphenylsilane and octamethylcyclotetrasilazane in a molar ratio of from ½ to 2 moles of the former per mole of the latter. It will be noted that the proportions of reactants employed in Example 5–B yield a viscous resinous material at ambient temperature while the product of Example 6 is a solid resinous material.

*Example 7*

This example illustrates the preparation of a resinous condensation product using a plurality of, specifically two, different organocyclosilazanes.

|  | Weight, g. | Molar Ratio |
| --- | --- | --- |
| Octamethylcyclotetrasilazane | 14.7 | 0.5 |
| Hexamethylcyclotrisilazane | 10.9 | 0.5 |
| Diphenylsilane | 32.2 | 1.75 |
| Sodium methoxide | 0.1 |  |

The above ingredients are mixed together in a 250-ml. flask fitted with an agitator, a condenser and a thermometer. While agitating the mixture, the temperature is raised over a period of about 2 hours from room temperature (20°–30° C.) to 265° C. at which temperature refluxing begins. Heating to reflux temperature is carried out slowly and carefully so as to avoid excessive foaming due to hydrogen evolution. By the time the reflux temperature is reached, the evolution of hydrogen has ceased. Heating is continued for about 2 hours longer. The product is poured off and cooled as in the previous examples. A clear, solid, brittle, thermoplastic resin results; softening point, 90°–110° C.

It will be understood, of course, by those skilled in the art that the present invention is not limited to the use of only those ingredients, proportions thereof and conditions of reaction given in the foregoing examples by way of illustration. For instance, instead of using sodium methoxide as the catalyst in the individual examples one may substitute any of the other alkali-metal alkoxides, e.g., potassium methoxide, sodium or potassium ethoxide, or any of the other alkali-metal alkoxides, or any of the other strong basic catalysts mentioned by way of illustration in the portion of this specification prior to the examples. Also, the amount of the di-(organo)silane reactant may be any portion other than the proportions employed in the specific examples and which is within the range of from 0.2 to 1.5 mole equivalents of the di-(organo)silane for each =NH grouping in the cyclosilazane. Di-(organo)silanes and organocyclosilazanes other than those employed in the individual examples may be used, that is, other silanes and other silazanes embraced for Formulas I and II. Numerous examples of such reactants will be apparent to those skilled in the art from the examples of monovalent hydrocarbon radicals represented by R, R', R" and R''' and from the definition of $n$ in the formula for the silazane reactant as being 3, 4 or 5.

If desired, the reaction between the silane and the cyclosilazane reactants may be effected in an inert (substantially completely inert), volatile (volatilizable), liquid, reaction medium. The chosen reaction medium should be inert both to the reactants and the catalysts for the reaction, and should have a boiling point sufficiently high so that the desired reaction temperature can be attained either at or below the reflux temperature of the reaction mass. Thus, depending upon the particular reactants employed and other influencing factors, the chosen reaction medium may be, for example, an aromatic hydrocarbon such as toluene, o-, m- and p-ethyl-, n-propyl-, isopropyl-, n-butyl-, and tert.-butyltoluenes, and the various xylenes; or an alkane having a boiling point or a boiling range of from 100° C. to 300° C. or higher at atmospheric pressure, depending upon the particular maximum temperature it is desired to attain during the reaction period.

If desired, the reaction medium may be evaporated from the reaction mass, for example by distillation at atmospheric pressure and/or under reduced pressure to leave a condensation product, more particularly a resinous condensation product, as a residue. Or, only part of the volatile reaction medium may be removed to leave a solution of the polymeric condensation product that is useful, for instance, as a surface-coating composition or as a component of such compositions. Or, the liquid reaction mass containing the resinous polymer may be employed, without removal of any of the volatile reaction medium, in such applications as those mentioned in the preceding sentence or for other purposes.

The solid polymers obtained by the method of this invention can be molded into a wide variety of useful articles for domestic and industrial use, or for decorative purposes. The liquid polymeric condensation products resulting from the process of the invention can be used as plasticizers for the solid polymers or for other polymers. As indicated hereinbefore, solutions of the solid polymers in a hydrocarbon solvent (e.g., benzene, toluene, etc.) or other organic solvent are useful as surface-coating compositions, particularly when admixed with other resins commonly employed in surface coatings.

The condensation polymers prepared by the technique of this invention, and which are liquid, semi-solid or solid at ambient temperature, are useful as plasticizers, as flow promoters (e.g., during molding), or for otherwise modifying a wide variety of condensation and addition polymers, natural gums and resins, natural and synthetic rubbers or elastomers, including various polyvinyl and polyacrylic resins, epoxy resins, urea-formaldehyde resins, melamine-formaldehyde resins, phenol-formaldehyde resins, alkyd resins, polyester resins, etc.

Dyes, pigments, opacifiers, inhibitors, lubricants, fillers such as cellulose in floc, filament or other form, glass fibers, metal fibers, silica, iron oxide, alumina, asbestos, etc., and other conventional additives to coating and molding compositions can be incorporated into the condensation polymers produced by the method of this invention, or into blends thereof with other natural and synthetic polymers, as desired or as the particular application conditions may require and in accordance with conventional practice.

From the foregoing it will be evident that modifications of this invention can be made without departing from the spirit and scope of this disclosure or from the scope of the following claims.

I claim:
1. The method of preparing a condensation product which comprises heating a mixture of the following reactants in the stated proportions at a reaction temperature within the range of from 100° C. to 400° C. in the presence of a catalytic amount of a strongly basic catalyst at least until the evolution of hydrogen has substantially completely subsided:
   (1) at least one di-(organo)silane represented by the general formula

where R and R' each represents a monovalent hydrocarbon radical, and (2) at least one cyclosilazane represented by the general formula

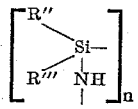

where R'' and R''' have the same meanings as R and R', and $n$ represents an integer from 3 to 5, inclusive, the reactants of (1) and (2) being employed in a ratio of from 0.2 to 1.5 mole equivalents of the di(organo)silane of (1) for each =NH grouping in the cyclosilazane of (2), said strongly basic catalyst being a member of the group consisting of (a) salts, with an alkali-forming metal, of an acid having a $pK_a$ of from 15 to 75, (b) tetramethyl ammonium hydroxide, (c) tetraethanol ammonium hydroxide, (d) benzyl trimethyl ammonium hydroxide and (e) benzyl triethyl ammonium hydroxide.

2. A method as in claim 1 wherein the strongly basic catalyst is a salt, with an alkali-forming metal, of an acid having a $pK_a$ of from 15 to 75.

3. A method as in claim 2 wherein the salt is an alkali-metal alkoxide.

4. A method as in claim 3 wherein the alkali-metal alkoxide is a sodium methoxide.

5. The method of preparing a condensation product which comprises heating a mixture of diphenylsilane and hexamethylcyclotrisilazane in a molar ratio of from 1 to 1.5 moles of the former per mole of the latter in the presence of a catalytic amount of an alkali-metal alkoxide, said heating being effected at a reaction temperature within the range of from 100° C. to 400° C. and being continued at least until the evolution of hydrogen has substantially completely subsided.

6. The method of preparing a condensation product which comprises heating a mixture of diphenylsilane and octamethylcyclotetrasilazane in a molar ratio of from ½ to 2 moles of the former per mole of the latter in the presence of a catalytic amount of an alkali-metal alkoxide, said heating being effected at a reaction temperature within the range of from 100° C. to 400° C. and being continued at least until the evolution of hydrogen has substantially completely subsided.

References Cited by the Examiner
UNITED STATES PATENTS
3,230,242   1/1966   Fink _____ 260—448.2

LEON J. BERCOVITZ, *Primary Examiner.*

M. I. MARQUIS, *Assistant Examiner.*